Nov. 13, 1956 TOMOMI MURAKAMI ET AL 2,770,720
HIGH FREQUENCY AMPLIFIER WITH ANODE TO
GRID INPUT AND ANODE TO CATHODE OUTPUT
Filed May 26, 1955 2 Sheets-Sheet 1

INVENTORS
TOMOMI MURAKAMI
& RICHARD W. SONNENFELDT
BY H. W. Newton
ATTORNEY

INVENTORS
TOMOMI MURAKAMI &
RICHARD W. SONNENFELDT
BY H. C. Newton
ATTORNEY

United States Patent Office 2,770,720

Patented Nov. 13, 1956

2,770,720

HIGH FREQUENCY AMPLIFIER WITH ANODE TO GRID INPUT AND ANODE TO CATHODE OUTPUT

Tomomi Murakami and Richard W. Sonnenfeldt, Haddonfield, N. J., assignors to Radio Corporation of America, a corporation of Delaware Application May 26, 1955, Serial No. 511,210

5 Claims. (Cl. 250—20)

This invention relates to amplifiers and more particularly to high frequency signal amplifiers for television receiver tuners and the like.

The input signal to a high frequency triode amplifier is usually applied between the control grid and the cathode of the amplifier tube, and the signal is developed primarily across the grid to cathode impedance of the tube. At low frequencies this impedance is practically infinite but at the higher frequencies, for instance, 40 megacycles and above, the impedance between grid and cathode become relatively small and may cause large signal attenuation. The input impedance of such an amplifier tube when used in a high frequency amplifier varies with the transconductance of the tube, and the transconductance, in turn, varies with an automatic gain control voltage that might be applied to the tube, such as would be the case in a television tuner.

Also, at the higher frequencies, the loading on the input signal caused by the relatively large finite time as compared to the period of the signal wave required for electrons emitted from the cathode to pass through the grid structure of the tube and reach the plate, commonly called transit time loading, serves to further attenuate the signal.

It is, therefore, an object of the present invention to provide an improved high frequency signal amplifier circuit having a relatively high input impedance at such operating frequencies, and in which the effects of transit time loading are minimized.

It is another object of the present invention to provide an improved high frequency electric tube signal amplifier for driving a grounded-grid amplifier with both amplifiers having their space current paths in series.

It is yet another object of the present invention to provide an improved signal amplifier circuit for use with television receiver tuners and the like wherein an automatic gain control voltage may be used without undesirable effects to vary the bias and the gain of one of the amplifier tubes.

These and other objects and advantages of present invention are achieved, in general, by providing a signal input circuit between the anode and the control grid of an amplifier tube, and a signal output circuit connected between the anode of the tube and a point of fixed reference potential for the amplifier to which the cathode is also connected. A gain of approximately unity is realized by such a circuit, with a reversal in phase between the input and output voltages. Variation of the grid-cathode impedance caused by a variation in the bias of the tube will not affect the signal input circuit to a substantial degree since it is connected between the grid and the anode. Transit time loading between the grid and the cathode will likewise not appreciably affect the signal.

However, the invention will be best understood when the following description is read in connection with the accompanying drawings.

Figure 1:
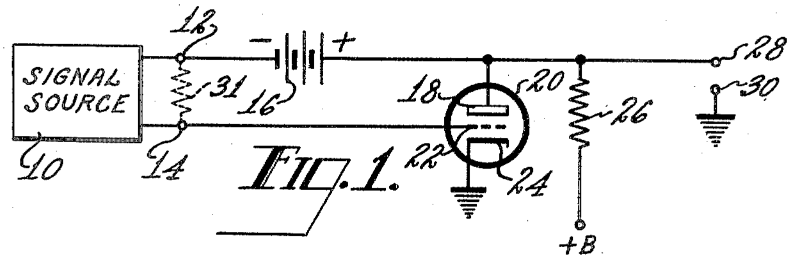
Figure 1 is a simplified schematic circuit diagram of a signal amplifier circuit illustrating the principle of operation of the invention.

Referring now to Figure 1, a signal voltage is applied from a signal source 10 to input terminals 12 and 14 of the signal amplifier circuit. One input terminal 12 is connected through a bias battery 16, which has no signal impedance, to the anode 18 of a signal amplifier tube 20. The other input terminal 14 is connected directly to the control grid of the tube 20. The cathode 24 of the amplifier tube 20 is connected directly to a point of reference potential or ground for the amplifier, and the anode 18 is connected through a load resistor 26 to a source of operating voltage, +B, positive with respect to ground. A signal output terminal 28 is connected to the anode 18 of the tube 20 and the output signal is developed between the output terminal 28 and a signal output ground terminal 30. The D.-C. conductive path through the signal source 10 is represented by the dotted resistor 31 connected between the input terminals 12, 14.

Since the signal voltage that is applied to the input terminals 12, 14 is connected between the anode 18 and the control grid 22, and the control grid is thus made to vary with respect to the anode 18. Since the cathode 24 is connected to ground, the battery 16 must apply sufficient bias, negative with respect to the anode 18, to the control grid 22 through the signal source 10 to bias the control grid 22 to the proper voltage with respect to the cathode 24 so the tube will be biased in its operating region.

Figure 2:
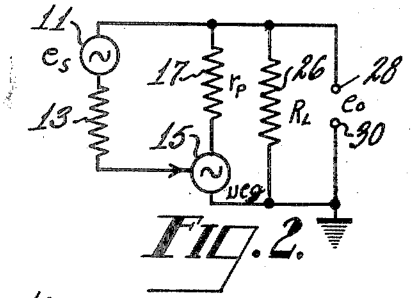
Figures 2 and 3 are equivalent circuit diagrams of the amplifier circuit shown in Figure 1 to further illustrate the operation of the invention.
Figure 3:
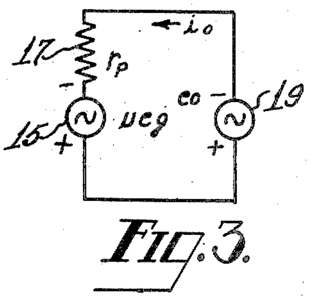

The operation of the circuit shown in Figure 1 can be best understood with reference to the equivalent circuit diagrams of Figures 2 and 3.

Referring particularly to Figure 2, the equivalent circuit diagram of the amplifier shown in Figure 1 used to determine the gain of the amplifier, the signal source 10 is represented by a generator 11 supplying a signal voltage, $e_s$. The internal impedance of the generator 11 is represented by a resistor 13 in series with the generator 11. A second generator 15 supplying a voltage $\mu e_g$ represents the amplified voltage of the tube 20 of Figure 1 and a resistance element 17 in series therewith represents the plate resistance, $r_p$, of the tube 20. Connected in series with the second generator 15 and the plate resistance ($r_p$) 17 is the load resistor (or $R_L$) 26 of the amplifier, and the output voltage, $e_o$, of the amplifier appears between the terminals 28 and 30 across the load resistor ($R_L$) 26. The side of the second generator 15 connected to the load resistor ($R_L$) 26 is grounded.

The signal voltage, $e_s$, is applied to the circuit and causes a voltage, $\mu e_g$, to be generated by the tube 20, and this voltage causes a current, $i_p$, to flow through the load resistor ($R_L$) 26, the plate resistance ($r_p$) 17, and the second generator 15. The voltage, $e_g$, appearing between the grid 22 and the cathode 24 will be equal to the signal voltage, $e_s$, plus the output voltage, $e_o$, since the voltage from the grid 22 directly to the cathode 24 which is grounded must equal the voltage from the grid 22 to the anode 18 plus the voltage from the anode 18 to ground, or expressed in equation form $$e_g = e_s + e_o \quad (1)$$

There is no current flowing in the grid-to-plate circuit so there is no voltage drop across the internal resistance 13 of the first generator 11.

The voltage drops through the closed circuit caused by the current $i_p$ flowing therethrough must equal the voltage in the circuit which is merely the voltage of the second generator 15, or $\mu e_g$, and expressed in equation form.

$$i_p(r_p + R_L) = \mu e_g \quad (2)$$

Therefore, substituting the value of $e_g$ of Equation 1 in Equation 2 and solving for $i_p$ $$i_p = \mu\frac{(e_s + e_o)}{r_p + R_L} \quad (3)$$

Since $e_o$ is the voltage developed across the load resistor ($R_L$) 26 by the current $i_p$ therethrough then $$e_o = i_p R_L \quad (4)$$

and $$i_p = \frac{e_o}{R_L} \quad (5)$$

Substituting the value of $i_p$ of Equation 5 in Equation 3 and solving for $$\frac{e_o}{e_s}$$

then $$\frac{e_o}{e_s} = \frac{\mu R_L}{r_p + R_L - \mu R_L} \quad (6)$$

If, as for instance in the common triode amplifier tube, $\mu >> 1$ and $\mu R_L >> (r_p + R_L)$, then $$\frac{e_o}{e_s} \cong -\frac{\mu R_L}{\mu R_L} \cong -1 \quad (7)$$

the minus sign indicating a phase reversal of the voltages.

The output impedance of the amplifier can be determined by the use of a second equivalent circuit as shown in Figure 3. The load resistor ($R_L$) 26 is replaced by a third generator 19, having an output voltage equal to $e_o$ and an output current equal to a current, $i_o$, flowing through the load resistor 26, connected in series with the second generator 15 of the tube 20 which has an output voltage equal to $\mu e_g$ and the plate resistance ($r_p$) 17 of the tube in series therewith. The input signal is short circuited and thus the voltage, $e_g$, from the grid 22 to the cathode 24, which is grounded, will equal the voltage from the anode 18 to ground, which is merely $e_o$. The output impedance, $Z_o$, is then given by the equation $$Z_o = \frac{e_o}{i_o} \quad (8)$$

Then, since the voltage around the circuit must equal zero and $\mu e_g$ is of a polarity opposite that of $e_o$, $$-\mu e_g + i_o r_p + e_o = 0 \quad (9)$$

Solving for $i_o$, $$i_o = \frac{\mu e_g + e_o}{r_p} \quad (10)$$

Then, as mentioned above, $$e_g = e_o \quad (11)$$

and substituting the value of $e_g$ from Equation 11 in Equation 10

$$i_o = \frac{\mu e_o + e_o}{r_p} = \frac{e_o(\mu + 1)}{r_p} \quad (12)$$

Now, substituting the value of $i_o$ of Equation 12 in Equation 8

$$Z_o = \frac{e_o}{\frac{e_o(\mu+1)}{r_p}} = \frac{r_p}{\mu + 1} \quad (13)$$

If $\mu >> 1$ then $$Z_o = \frac{r_p}{\mu} \quad (14)$$

But since $$\frac{\mu}{r_p}$$

is defined as the transconductance, $g_m$, of a triode tube $$Z_o = \frac{1}{g_m} \quad (15)$$

The voltage gain of the amplifier is thus seen to be approximately unity with a reversal of phase, and the output impedance in approximately equal to the reciprocal of the transconductance of the tube being used, which is a relatively low impedance. However, the input impedance of the amplifier is quite high since the signal is applied between the anode and the control grid. The physical spacing between the anode and the control grid is large compared to the spacing between the grid and cathode in most amplifier tubes.

Variation of the bias on the control grid of a triode tube changes the impedance between the cathode and the grid but does not appreciably change the grid-to-anode impedance and hence does not seriously affect the signal input circuit to the tube.

At the higher frequency, that is, above 40 megacycles, transit time effects caused by the time taken by the electrons emitted by the cathode to pass through the grid and reach the anode causes an appreciable loading of the grid-to-cathode circuit, but does not seriously affect the anode-to-grid circuit until much higher frequencies.

Figure 4:
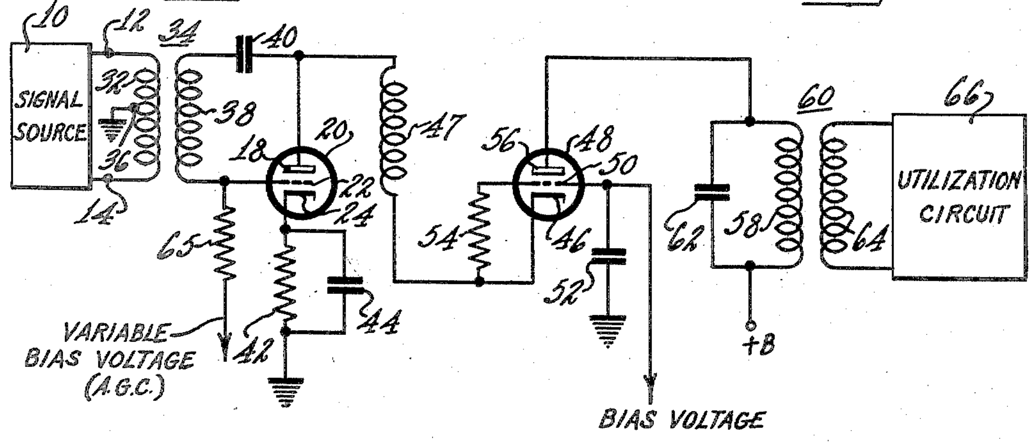
Figure 4 is a schematic circuit diagram of a high frequency signal amplifier including a driven grounded-grid amplifier circuit and a driving amplifier circuit embodying the invention; and, Figure 5 is a schematic circuit diagram of a television receiver tuner having a driven grounded-grid amplifier in which the driving amplifier is constructed in accordance with the present invention.

Referring now to the embodiment shown in Figure 4, signal voltages from the input signal source 10 are applied to the input terminals 12 and 14 which are connected to opposite ends of a primary winding 32 of a radio frequency transformer 34. The tap 36 of the primary 32 may be grounded to provide a balanced circuit for the signal source 10. The secondary 38 of the transformer has one side connected to the anode 18 of the amplifier tube 20 through a blocking capacitor 40 and the other side connected directly to the control grid 22. Signal voltages thus appear between the anode 18 and grid 22. The cathode 24 is connected to ground through a bias resistor 42, which resistor is by-passed at signal frequencies by a capacitor 44.

The anode 18 of the amplifier tube 20 is connected directly to the cathode 46 of a second amplifier tube 48 through an inductor 47, thus coupling the signal voltages appearing on the anode 18 of the first amplifier tube 20 directly to the cathode 46 of a second amplifier tube 48. The grid 50 of the second amplifier tube 48 is biased by connecting it to a suitable source of fixed bias voltage (not shown), and is also connected to ground for signal frequencies by a capacitor 52. A resistor 54 connected between the cathode 46 and the control grid 50 provides a D.-C. return path between the grid 50 and the cathode 46.

The anode 56 of the second or grounded-grid amplifier tube 48 is connected through the primary 58 of an output transformer 60 to a source of operating voltage, +B, positive with respect to ground, and signal voltages appearing on the anode 56 are coupled by this connection to the primary 58 of the transformer 60. The primary 58 is shunted by a capacitor 62 which provides a tuning means. The secondary 64 of the transformer 60 couples the signals to a utilization circuit 66.

The amplifier tube 20 operates in the same manner as hereinbefore described in connection with Figure 1. However, the anode load resistor 26 of Figure 1 is replaced by a grounded-grid amplifier tube 48 and its associated circuitry, and the space current paths of the two tubes 20 and 48 are connected in series. The signal on the anode 18 of the tube 20 is coupled through the inductor 47 to the cathode 46 of the grounded-grid amplifier tube 48. Since the grid 50 of the grounded-grid amplifier tube 48 is held at ground potential, the variation of the potential on the cathode 46 provides the signal for this tube. The signals at the anode 56 of the grounded-grid amplifier tube 48 are coupled to a tuned circuit comprising the primary winding 58 of the transformer 60 and the shunt capacitor 62. The signals are then coupled, as explained before, from the secondary winding 64 of the transformer 60 to any desired utilization circuit 66.

A variable voltage for biasing the amplifier tube 20 may be applied to the grid 22 directly through an isolating resistor 65 from a variable bias source (not shown) which may be an automatic gain control circuit. The variation of the bias voltage on the grid 22 of the first amplifier tube 20, as explained before, will cause the impedance between the grid 22 and the cathode 24 to vary but this variation will not affect the loading of the signal input circuit because this variation is between grid 22 and ground while the signal is applied between the grid 22 and the anode 18. The grid-to-plate impedance of the tube 20 will not vary appreciably with the change of bias voltage on the grid 22.

Figure 5:
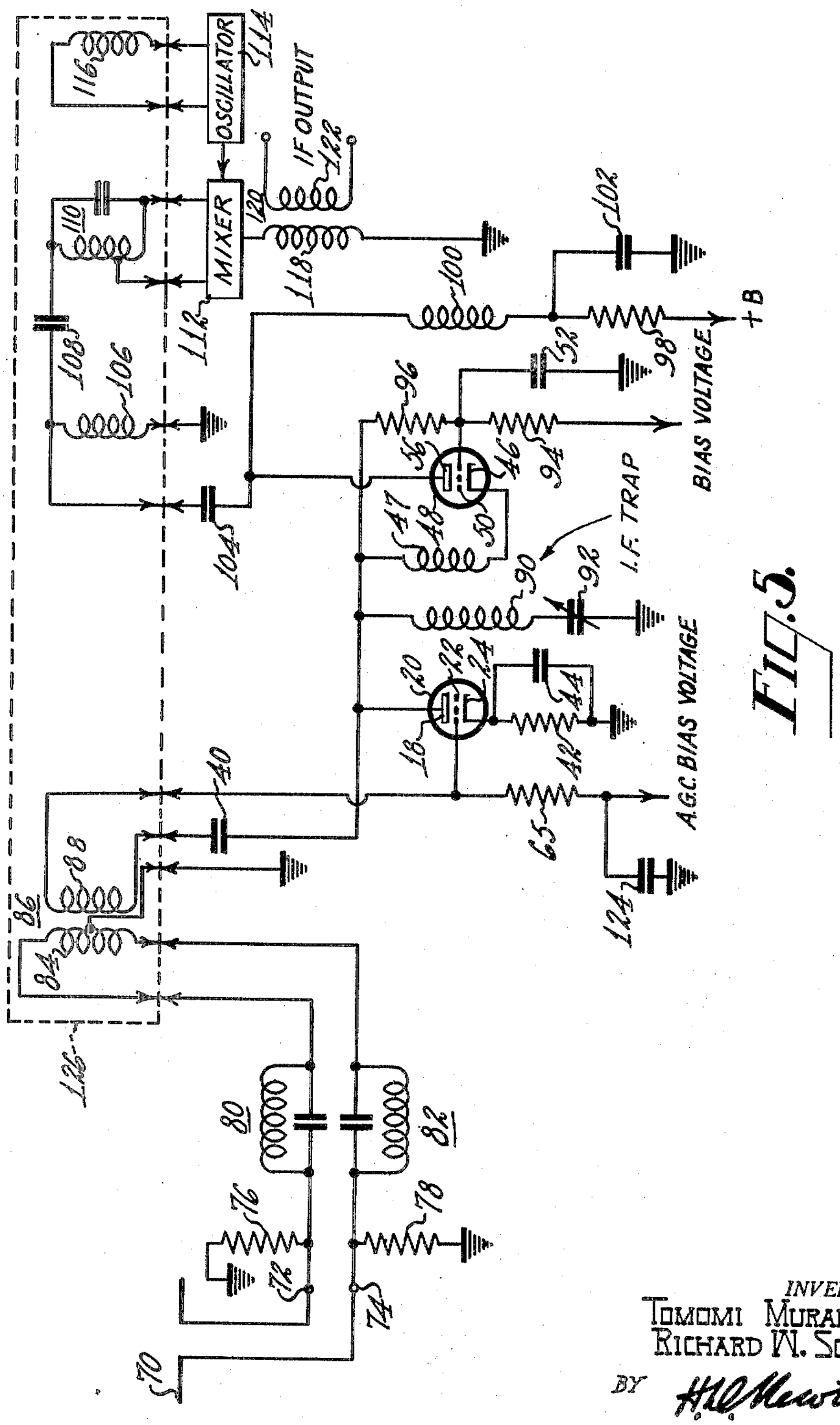

Referring now to Figure 5, a V. H. F. television tuner having a radio frequency amplifier embodying the present invention receives signals on an antenna 70. Signals are coupled from the antenna 70 to input terminals 72 and 74. Static drain resistors 76 and 78 may be connected from input terminals 72 and 74, respectively, to ground to provide a grounded center tap for the antenna if the input transformer does not have a center tap.

The signals are then coupled from the input terminals 72 and 74 through intermediate frequency traps 80 and 82 to the primary 84 of a signal input transformer 86. The secondary 88 of the input transformer 86 has one side connected through a coupling capacitor 40 to the anode 18 of a first amplifier tube 20, and the other side directly connected to the grid 22. The cathode 24 of the tube 20 is connected to ground through a bias resistor 42 and a signal by-pass capacitor 44 shunts the bias resistor 42 and connects the cathode 24 to ground for signal frequencies.

Signals from the first amplifier tube 20 appear at the anode 18 and are directly coupled through the inductor 47 to the cathode 46 of the second amplifier tube 48. An inductor 90 is connected in series with a capacitor 92 from the anode 18 of a first amplifier tube 20 to ground as a series resonant trap for any intermediate frequency voltage that might appear on the anode 18.

The grid 50 of the second amplifier tube 48 is grounded for signal frequencies by capacitor 52, and a bias voltage is supplied to the grid 50 through a resistor 94 from a source of bias voltage (not shown). A D.-C. return path for the grid 50 is provided through a resistor 96 connected between the grid 50 of the second amplifier tube 48 and the anode 18 of the first amplifier tube 20.

Operating voltage is supplied to the two tubes 48 and 18 from a source of voltage, +B, positive with respect to ground through a resistor 98 in series with an inductor 100 connected directly to the anode 56 of the second amplifier tube 48. A capacitor 102 is connected between the junction of the resistor 98 and the inductor 100 to ground to provide decoupling of the signal from the voltage supply source, +B.

Signals appearing at the anode 56 of a second amplifier tube 48 are coupled through a coupling capacitor 104 to a load inductor 106 to ground, and through a second coupling capacitor 108 to a mixer input circuit 110. The signals are then coupled directly to a mixer circuit 112 and mixed with a local oscillator signal from the local oscillator 114. The frequency of the oscillator 114 is determined by the inductor 116 connected to it.

The output signal from the mixer 112 is coupled to the primary 118 of an intermediate frequency output transformer 120 to ground and the intermediate signals appearing on the secondary 122 of the intermediate frequency transformer are coupled to the remainder of the television receiver (not shown).

The signal input transformer 86, the load inductor 106, coupling resistor 108, the mixer input circuit 110 and the oscillator inductor 116 may be part of a tuning strip 126 which may be connected to the television tuner proper. For instance, in the V. H. F. television range a separate strip would be provided for each television channel to be selectively connected to the tuner.

An automatic gain control bias is applied to the grid 22 of the first amplifier tube 20 through an isolating resistor 65. A capacitor 124 is connected from the end of the isolating resistor 65 remote from the grid 22 to ground to prevent any radio frequency signals from appearing in the AGC circuit. The AGC circuit (not shown) may be part of a television receiver (not shown).

The automatic gain control voltage may be applied directly to the grid 22 of the amplifier tube 20 without compensation for the loading of the grid-to-cathode circuit of the amplifier tube 20, for, even though the grid-to-cathode loading does change with automatic gain control voltage changes, the loading of the signal input circuit between the grid 22 and the anode 18 of the amplifier tube 20 does not change appreciably and hence requires no compensation.

A radio frequency amplifier circuit constructed in accordance with the present invention is characterized by its high input impedance at high frequencies and minimized transit time loading effects. Further, an automatic gain control voltage may be applied to the amplifier without seriously affecting the termination of the input signal circuit.

What is claimed is:

1. A high-frequency signal amplifier comprising in combination, a first and a second electron tube, each of said tubes having an anode, a cathode and a control grid; means providing a direct current connection between the anode of said first tube to the cathode of said second tube; means for applying a signal voltage between the anode and the control grid of said first tube; means effectively connecting the cathode of said first tube to ground for said amplifier at signal frequencies; means effectively connecting the control grid of said second tube to said ground at signal frequencies; and means for deriving an output signal from said amplifier between the anode of said second tube and said ground.

2. A high-frequency signal amplifier comprising in combination, a first and a second electron tube, each of said tubes having an anode, a cathode and a control grid, means including an inductor for providing a direct current connection between the anode of said first tube to the cathode of said second tube, transformer means for applying a signal voltage between the anode and the control grid of said first tube, a bias resistor connected between the cathode of said first tube and ground for said amplifier, means effectively connecting the cathode of said first tube to said ground at signal frequencies, means effectively connecting the control grid of said second tube to ground at signal frequencies, and means for deriving an output signal from said amplifier between the anode of said second tube and said ground.

3. A high-frequency driven grounded-grid signal amplifier comprising; a pair of electron tubes each having an anode, a cathode, and a control grid; means including a transformer for applying a signal between the anode and the control grid of a first of said electron tubes; a biasing resistor connected between the cathode of said first tube and ground for said amplifier; a by-pass capacitor connected in parallel with said bias resistor; an inductor connected between the anode of said first tube and the cathode of the second of said electron tubes; means for providing a bias voltage for the control grid of said second tube; capacitor means connected between the control grid of said second tube and said ground for connecting said control grid to ground at signal frequencies; and means including the primary winding of a transformer connected between the anode of said second tube and said ground for deriving an output signal from said amplifier.

4. In a television receiver V. H. F. tuner for converting received signals from any one of a plurality of V. H. F. television stations to corresponding signals of intermediate frequency, the combination of; an antenna input circuit; radio frequency amplifier means having a first and a second amplifier tube, each of said tubes having an anode, a cathode, and a control grid; a signal input circuit for said amplifier means connected between the anode and the control grid of said first tube; signal selection means for selecting any one of said plurality of V. H. F. television stations connected between said antenna input circuit and said amplifier input circuit; means for connecting the cathode of said first amplifier tube to ground for said receiver at signal frequencies; means for applying signals from the anode of said first tube to the cathode of said second tube; means for connecting the control grid of said second tube to said ground at signal frequencies; means connected to the anode of said second tube for tuning the output circuit of said radio frequency amplifier means to the frequency of said selected V. H. F. television station; a signal mixing circuit; means for applying the signal output of said radio frequency amplifier means to said mixing circuit; and means providing a local oscillator signal for said mixing circuit.

5. In a television receiver V. H. F. tuner for converting received signals from any one of a plurality of V. H. F. television stations to corresponding signals of an intermediate frequency, the combination of; an antenna input circuit; radio frequency amplifier means having a first and a second amplifier tube, each of said tubes having an anode, a cathode, and a control grid; a signal input circuit for said amplifier means connected between the anode and the control grid of said first amplifier tube; means for connecting the cathode of said first amplifier tube to a ground for said receiver at signal frequencies; means providing a signal connection between the anode of said first tube and the cathode of said second tube; means effectively connecting the control grid of said second tube to said ground at signal frequencies; a plurality of tuning strips, each strip adapted to select one of said plurality of V. H. F. television stations; means for selectively connecting one of said strips of said V. H. F. tuner, each of said strips having a first and a second tuned coupling circuit associated therewith; means for connecting said first coupling circuit between said antenna input circuit and said signal input circuits for said amplifier means; a signal mixing circuit; means for connecting said second coupling circuit between the anode of said second amplifier tube and said signal mixing circuit; and means providing a local oscillator signal for said mixing circuit.

References Cited in the file of this patent

UNITED STATES PATENTS

| | | |
|---|---|---|
| 1,921,187 | Hollmann | Aug. 8, 1933 |
| 2,550,990 | Gilbert | May 1, 1951 |
| 2,584,850 | De Mers | Feb. 5, 1952 |
| 2,695,975 | Sanford | Nov. 30, 1954 |

FOREIGN PATENTS

| | | |
|---|---|---|
| 814,606 | Germany | Sept. 24, 1951 |